United States Patent
Waymeyer et al.

(10) Patent No.: US 11,457,571 B2
(45) Date of Patent: Oct. 4, 2022

(54) MODULAR LIGHTING SYSTEM FOR AN INDOOR GARDEN CENTER

(71) Applicant: Haier US Appliance Solutions, Inc., Wilmington, DE (US)

(72) Inventors: Jordan Andrew Waymeyer, Louisville, KY (US); Joseph Thomas Waugh, Louisville, KY (US); Erik Stennis, Louisville, KY (US); Darin Franks, Lanesville, IN (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 132 days.

(21) Appl. No.: 17/109,521

(22) Filed: Dec. 2, 2020

(65) Prior Publication Data
US 2022/0167567 A1 Jun. 2, 2022

(51) Int. Cl.
| | |
|---|---|
| *A01G 9/24* | (2006.01) |
| *H05B 45/345* | (2020.01) |
| *H05B 45/325* | (2020.01) |
| *A01G 7/04* | (2006.01) |
| *A01G 9/02* | (2018.01) |

(52) U.S. Cl.
CPC ............ *A01G 9/249* (2019.05); *A01G 7/045* (2013.01); *A01G 9/023* (2013.01); *H05B 45/325* (2020.01); *H05B 45/345* (2020.01)

(58) Field of Classification Search
CPC ... A01G 9/18; A01G 9/14; A01G 9/16; A01G 7/045; A01G 9/023; A01G 9/249
See application file for complete search history.

(56) References Cited

U.S. PATENT DOCUMENTS

| | | | |
|---|---|---|---|
| 6,536,157 B2 * | 3/2003 | Wijbenga | A01G 9/16 47/17 |
| 8,333,487 B2 | 12/2012 | Mekhtarian | |
| 8,523,385 B2 | 9/2013 | Lu et al. | |
| 9,310,027 B2 | 4/2016 | Wells | |
| 10,390,406 B2 | 8/2019 | Modepalli et al. | |
| 10,667,370 B2 | 5/2020 | Aykroyd et al. | |
| 2016/0178179 A1 | 6/2016 | Hanson et al. | |
| 2018/0332776 A1 * | 11/2018 | O'Keefe | A01G 9/14 |
| 2019/0082612 A1 * | 3/2019 | Bitetti | A01G 7/045 |
| 2019/0320605 A1 * | 10/2019 | Buj | A01G 9/249 |

(Continued)

FOREIGN PATENT DOCUMENTS

WO WO2020/097596 A1 5/2020

*Primary Examiner* — Monica L Perry
(74) *Attorney, Agent, or Firm* — Dority & Manning, P.A.

(57) ABSTRACT

A modular lighting system is provided. The modular lighting system includes a first LED board. The first LED board includes one or more LED arrays. The one or more LED arrays include one or more ultraviolet LED light sources and one or more non-ultraviolet LED light sources. The first LED board further includes one or more constant current LED drivers configured to output a driver current for the one or more LED arrays. The modular lighting system further includes a second LED board. The second LED board includes one or more LED arrays. The one or more LED arrays include one or more non-ultraviolet LED light sources. The second LED board further includes one or more constant current LED drivers configured to output a driver current for the one or more LED arrays of the second LED board.

14 Claims, 14 Drawing Sheets

(56) References Cited

U.S. PATENT DOCUMENTS

| | | | |
|---|---|---|---|
| 2020/0037514 A1* | 2/2020 | Massey | A01G 9/247 |
| 2020/0352360 A1* | 11/2020 | Hunter | A47F 7/0078 |
| 2021/0084828 A1* | 3/2021 | Hunter | H05B 45/20 |
| 2021/0084836 A1* | 3/2021 | Hunter | A01G 9/16 |

* cited by examiner

MODULAR LIGHTING SYSTEM FOR AN INDOOR GARDEN CENTER

FIELD OF THE INVENTION

The present subject matter relates generally to systems for gardening plants indoors, and more particularly, to a modular LED lighting system for an indoor garden appliance.

BACKGROUND OF THE INVENTION

Conventional indoor garden centers include a cabinet defining a grow chamber having a number of trays or racks positioned therein to support seedlings or plant material, e.g., for growing herbs, vegetables, or other plants in an indoor environment. In addition, such indoor garden centers may include a lighting system configured to illuminate the plant material to promote photosynthesis.

The wavelength of light that best promotes growth differs according to the plant material. For instance, mushrooms grow most efficiently when illuminated with blue light, whereas other plant material (e.g., not mushrooms) does not grow as efficiently when illuminated with blue light. Conventional lighting systems can include several different types of light sources in order to provide the different types of lighting to accommodate different types of plants. However, including several different types of light sources can make lighting systems larger and more complicated, which is generally undesirable in confined spaces (e.g., grow chamber).

Accordingly, an improved indoor garden center would be useful. More particularly, an indoor garden center with a lighting system that can be configured to provide different wavelengths as needed to accommodate different plant materials within the grow chamber.

BRIEF DESCRIPTION OF THE INVENTION

Aspects and advantages of the invention will be set forth in part in the following description, or may be apparent from the description, or may be learned through practice of the invention.

In one aspect, a gardening appliance is provided. The gardening appliance includes a cabinet and a liner positioned within the cabinet. The liner defines a chamber. The gardening appliance includes a grow module mounted within the liner. The grow module defines a pod aperture configured to receive a plant pod. The grow module includes a central hub rotatable about a central axis. The grow module further includes a plurality of partitions. Each of the partitions extends from the central hub to divide the chamber into a plurality of chambers. The gardening appliance include one or more doors coupled to the cabinet. The one or more doors are movable between an open position and a closed position to permit selective access to the grow module. The gardening appliance includes a modular lighting system. The modular lighting system includes a first LED board. The first LED board includes one or more LED arrays. The one or more LED arrays include one or more ultraviolet LED light sources and one or more non-ultraviolet LED light sources configured to illuminate a first chamber of the plurality of chambers. The first LED board further includes one or more constant current LED drivers configured to output a driver current for the one or more LED arrays. The modular lighting system further includes a second LED board. The second LED board includes one or more LED arrays. The one or more LED arrays include one or more non-ultraviolet LED light sources configured to illuminate a second chamber of the plurality of chambers. The second LED board further includes one or more constant current LED drivers configured to output a driver current for the one or more LED arrays of the second LED board.

In another aspect, a modular lighting system is provided. The modular lighting system includes a first LED board. The first LED board includes one or more LED arrays. The one or more LED arrays include one or more ultraviolet LED light sources and one or more non-ultraviolet LED light sources. The first LED board further includes one or more constant current LED drivers configured to output a driver current for the one or more LED arrays. The modular lighting system further includes a second LED board. The second LED board includes one or more LED arrays. The one or more LED arrays include one or more non-ultraviolet LED light sources. The second LED board further includes one or more constant current LED drivers configured to output a driver current for the one or more LED arrays of the second LED board.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
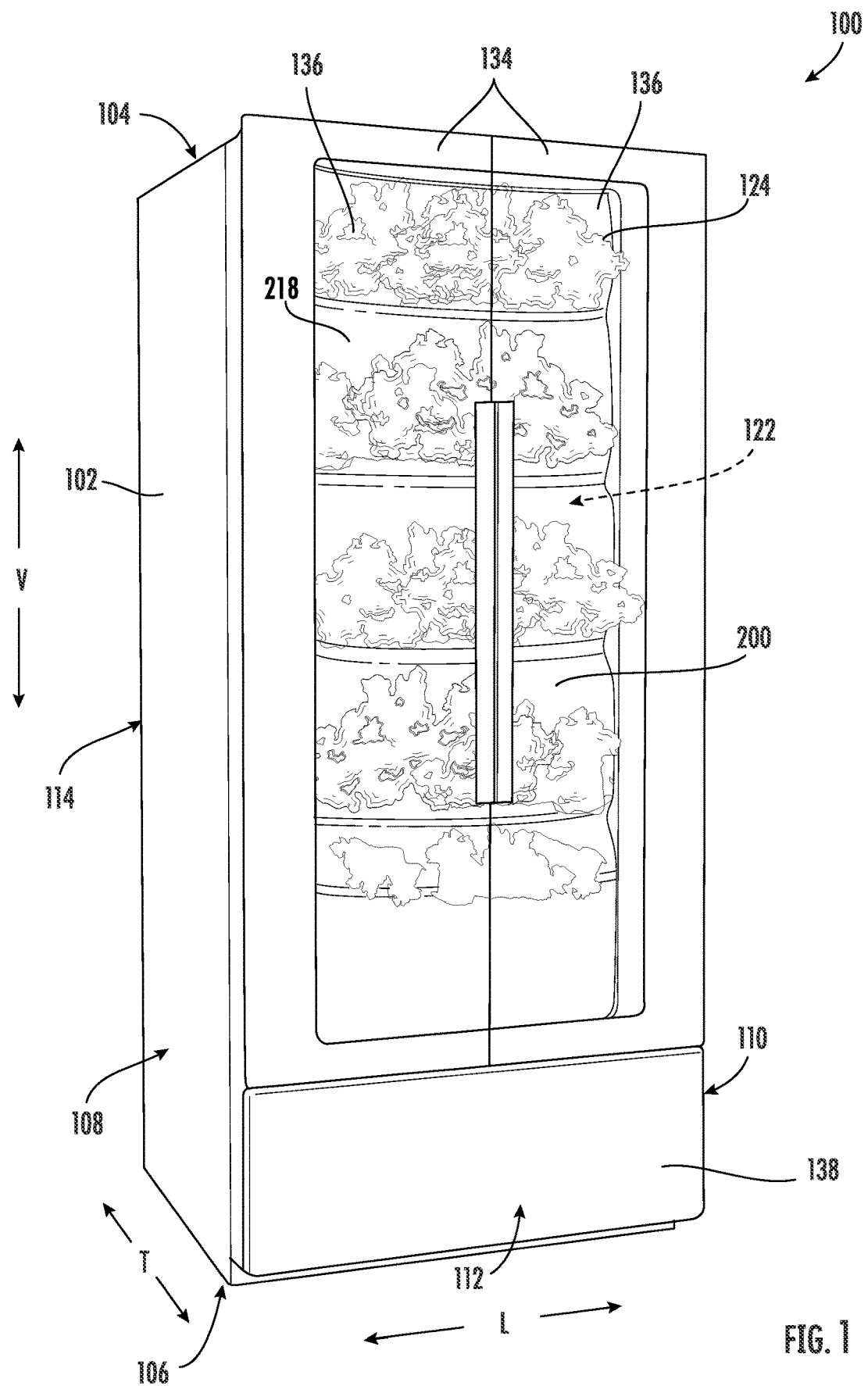
FIG. 1 depicts a perspective view of a gardening appliance according to an exemplary embodiment of the present subject matter.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, terms of approximation, such as "approximately," "substantially," or "about," refer to being within a ten percent (10%) margin of error of the stated value. Moreover, as used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Example aspects of the present disclosure are directed to a modular lighting system. The modular lighting system can include a first LED board and a second LED board. The first LED board and the second LED board can each include one or more LED arrays. The one or more LED arrays of the first LED board can include one or more ultraviolet LED light sources and one or more non-ultraviolet LED light sources. The one or more LED arrays of the second LED board can include one or more non-ultraviolet LED light sources. Furthermore, the first LED board and the second LED board can each include one or more constant current LED drivers.

The one or more constant current LED drivers can be configured to receive input power (e.g., direct current power signal). For instance, the modular lighting system can include one or more direct current power supplies configured to receive an alternating current power from an alternating current power source (not shown). The one or more direct current power supplies can be configured to convert the alternating current power to direct current power that is provided to the one or more constant current LED drivers as the input power.

The one or more constant current LED drivers of the first LED board can be configured to convert the input power to a suitable driver current for powering the one or more LED arrays of the first LED board. Likewise, the one or more constant current LED drivers of the second LED board can be configured to convert the input power to a suitable driver current for powering the one or more LED arrays of the second LED array.

In some implementations, the modular lighting system can include a control board having a control circuit configured to output one or more control signals to the one or more constant current LED drivers. Furthermore, the one or more constant current LED drivers can be configured to convert the input power to the driver current based, at least in part, on the one or more control signals. For instance, in some implementations, the one or more control signals can include a pulse width modulated signal.

In some implementations, the first LED board and the second LED board can each include a first LED array and a second LED array. Furthermore, the first LED board and the second LED board can each include a first constant current LED driver and a second constant current LED driver. The first constant current LED driver can be configured to provide a first driver current for the first LED array. The second constant current LED driver can be configured to provide a second driver current for the second LED array. In this manner, the first LED array and the second LED array can be independently controlled.

In some implementations, the first LED board and the second LED board can include one or more resistors (e.g., shunt resistor). For instance, the first LED board and the second LED board can each include a first resistor coupled between the first LED array and the first constant current LED driver. In this manner, the first constant current LED driver can set the first driver current based, at least in part, on a resistance of the first resistor. Furthermore, the first LED board and the second LED board can each include a second resistor coupled between the second LED array and the second constant current LED driver. In this manner, the second constant current LED driver can set the second driver current based, at least in part, on a resistance of the second resistor.

The modular lighting system according to example embodiments of the present disclosure can provide numerous technical effects and benefits. For instance, the one or more constant current LED drivers on the first LED board and the second LED board allow the first LED board and the second LED board to be swapped out for other LED board having different LED arrays without needing to adjust the output (e.g., one or more control signals) of the control circuit on the control board. In this manner, the end-user can swap out the LED boards to configured to modular lighting system to accommodate different types of plants, funguses, etc. In addition, the end-user can replace LED boards when performance (e.g., brightness) of one or more LED light sources thereon begins to degrade.

Referring now to the FIGS. FIGS. 1 through 8 depict a gardening appliance 100 according to an exemplary embodiment of the present subject matter. According to exemplary embodiments, gardening appliance 100 may be used as an indoor garden center for growing plants. It should be appreciated that the embodiments described herein are intended only for explaining aspects of the present subject matter.

Variations and modifications may be made to gardening appliance 100 while remaining within the scope of the present subject matter.

Gardening appliance 100 includes a housing or cabinet 102 that extends between a top 104 and a bottom 106 along a vertical direction V, between a first side 108 and a second side 110 along a lateral direction L, and between a front side 112 and a rear side 114 along a transverse direction T. Each of the vertical direction V, lateral direction L, and transverse direction T are mutually perpendicular to one another and form an orthogonal direction system.

Gardening appliance 100 may include an insulated liner 120 positioned within cabinet 102. Liner 120 may at least partially define a temperature controlled, referred to herein generally as a grow chamber 122, within which plants 124 may be grown. Although gardening appliance 100 is referred to herein as growing plants 124, it should be appreciated that other organisms or living things may be grown or stored in gardening appliance 100. For example, algae, fungi (e.g., including mushrooms), or other living organisms may be grown or stored in gardening appliance 100. The specific application described herein is not intended to limit the scope of the present subject matter.

Cabinet 102, or more specifically, liner 120 may define a substantially enclosed back region or portion 130. In addition, cabinet 102 and liner 120 may define a front opening, referred to herein as front display opening 132, through which a user of gardening appliance 100 may access grow chamber 122, e.g., for harvesting, planting, pruning, or otherwise interacting with plants 124. According to an exemplary embodiment, enclosed back portion 130 may be defined as a portion of liner 120 that defines grow chamber 122 proximate the rear side 114 of cabinet 102. In addition, front display opening 132 may generally be positioned proximate or coincide with front side 112 of cabinet 102.

Figure 2:
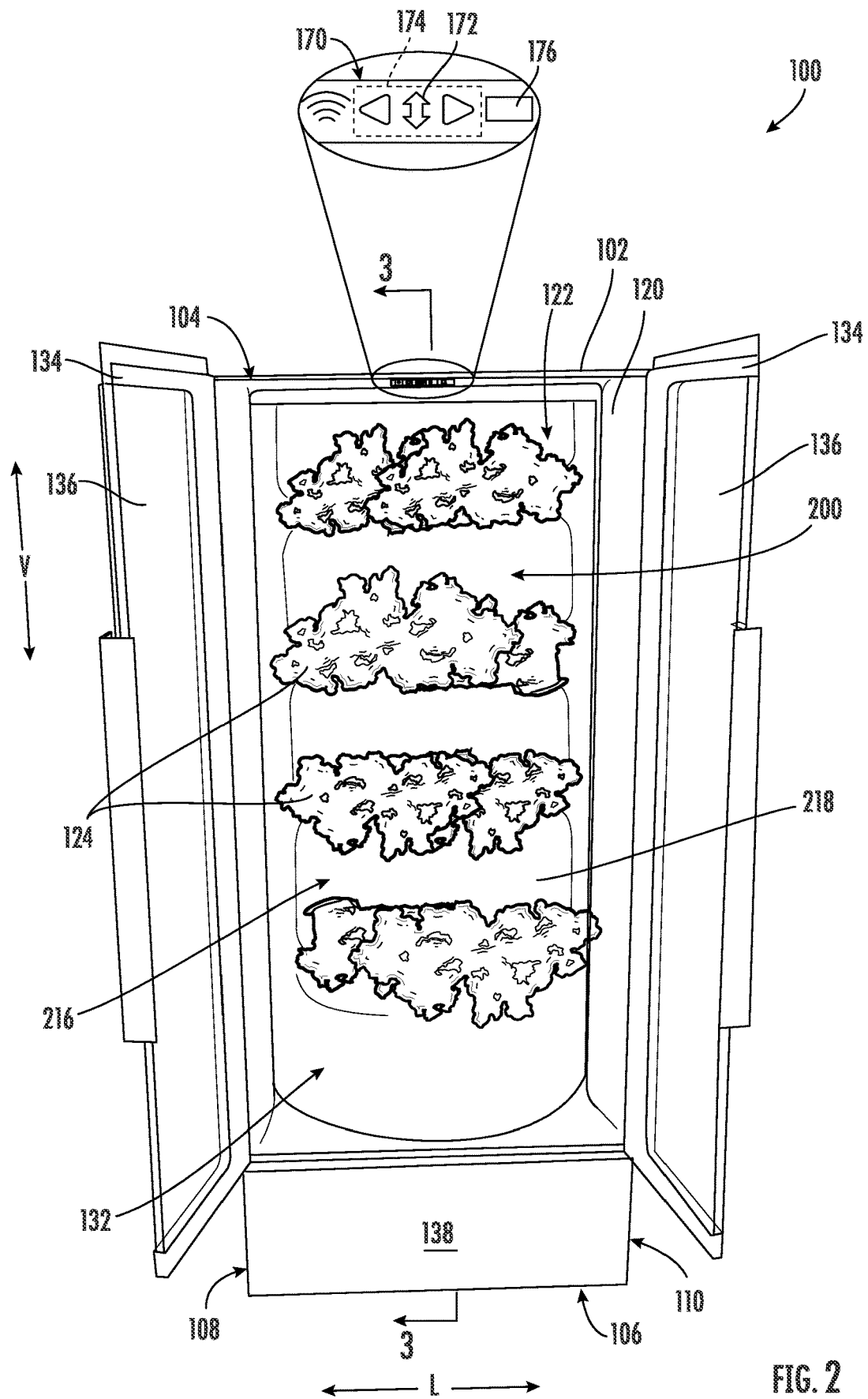
FIG. 2 depicts a front view of the exemplary gardening appliance of FIG. 1 with the doors open according to an exemplary embodiment of the present subject matter.

Gardening appliance 100 may further include one or more doors 134 that are rotatably mounted to cabinet 102 for providing selective access to grow chamber 122. For example, FIG. 1 illustrates doors 134 in the closed position such that they may help insulate grow chamber 122. By contrast, FIG. 2 illustrates doors 134 in the open positioned for accessing grow chamber 122 and plants 124 stored therein. Doors 134 may further include a transparent window 136 through which a user may observe plants 124 without opening doors 134.

Although doors 134 are illustrated as being rectangular and being mounted on front side 112 of cabinet 102 in FIGS. 1 and 2, it should be appreciated that according to alternative embodiments, doors 134 may have different shapes, mounting locations, etc. For example, doors 134 may be curved, may be formed entirely from glass, etc. In addition, doors 134 may have integral features for controlling light passing into and/or out of grow chamber 122, such as internal louvers, tinting, UV treatments, polarization, etc. One skilled in the art will appreciate that other chamber and door configurations are possible and within the scope of the present invention.

According to the illustrated embodiment, cabinet 102 further defines a drawer 138 positioned proximate to the bottom 106 of cabinet 102 and being slidably mounted to cabinet for providing convenient storage for plant nutrients, system accessories, water filters, etc. In addition, behind drawer 138 is a mechanical compartment 140 for receipt of an environmental control system including a sealed system for regulating the temperature within grow chamber 122, as described in more detail below.

Figure 3:
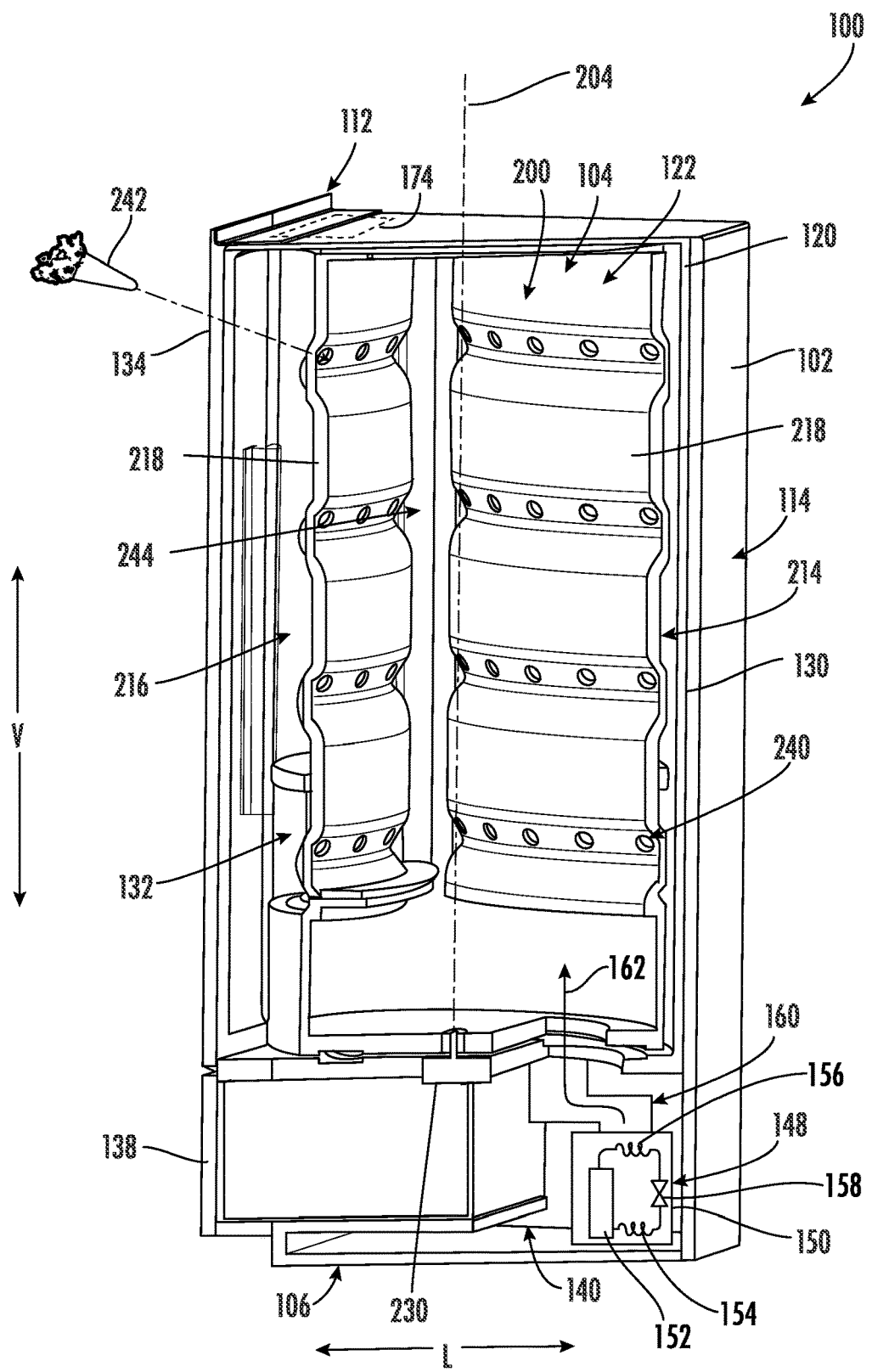
FIG. 3 depicts a cross sectional view of the exemplary gardening appliance of FIG. 1, taken along Line 3-3 from FIG. 2 with an internal divider removed for clarity.

The gardening appliance 100 can include an environmental control system 148 that may be used to regulate a temperature within grow chamber 122. Specifically, environmental control system 148 may include a sealed system 150, a duct system 160, or any other suitable components or subsystems for regulating an environment within grow chamber 122, e.g., for facilitating improved or regulated growth of plants 124 positioned therein. Specifically, FIG. 3 illustrates sealed system 150 within mechanical compartment 140. Although an exemplary sealed system is illustrated and described herein, it should be appreciated that variations and modifications may be made to sealed system 150 while remaining within the scope of the present subject matter. For example, sealed system 150 may include additional or alternative components, different ducting configurations, etc.

As shown, sealed system 150 includes a compressor 152, a first heat exchanger or evaporator 154 and a second heat exchanger or condenser 156. As is generally understood, compressor 152 is generally operable to circulate or urge a flow of refrigerant through sealed system 150, which may include various conduits which may be utilized to flow refrigerant between the various components of sealed system 150. Thus, evaporator 154 and condenser 156 may be between and in fluid communication with each other and compressor 152.

During operation of sealed system 150, refrigerant flows from evaporator 154 and to compressor 152, and compressor 152 is generally configured to direct compressed refrigerant from compressor 152 to condenser 156. For example, refrigerant may exit evaporator 154 as a fluid in the form of a superheated vapor. Upon exiting evaporator 154, the refrigerant may enter compressor 152, which is operable to compress the refrigerant. Accordingly, the pressure and temperature of the refrigerant may be increased in compressor 152 such that the refrigerant becomes a more superheated vapor.

Condenser 156 is disposed downstream of compressor 152 and is operable to reject heat from the refrigerant. For example, the superheated vapor from compressor 152 may enter condenser 156 and transfer energy to air surrounding the condenser 156 (e.g., to create a flow of heated air). In this manner, the refrigerant condenses into a saturated liquid and/or liquid vapor mixture. A condenser fan (not shown) may be positioned adjacent to the condenser 156 and may facilitate or urge the flow of heated air across the coils of condenser 156 (e.g., from ambient atmosphere) in order to facilitate heat transfer.

According to the illustrated embodiment, an expansion device or a variable electronic expansion valve 158 may be further provided to regulate refrigerant expansion. During use, variable electronic expansion valve 158 may generally expand the refrigerant, lowering the pressure and temperature thereof. In this regard, refrigerant may exit the condenser 156 in the form of high liquid quality/saturated liquid vapor mixture and travel through variable electronic expansion valve 158 before flowing through evaporator 154. Variable electronic expansion valve 158 is generally configured to be adjustable, e.g., such that the flow of refrigerant (e.g., volumetric flow rate in milliliters per second) through variable electronic expansion valve 158 may be selectively varied or adjusted.

Evaporator 154 is disposed downstream of variable electronic expansion valve 158 and is operable to heat refrigerant within evaporator 154, e.g., by absorbing thermal energy from air surrounding the evaporator (e.g., to create a flow of cooled air). For example, the liquid or liquid vapor mixture refrigerant from variable electronic expansion valve 158 may enter evaporator 154. Within evaporator 154, the refrigerant from variable electronic expansion valve 158 receives energy from the flow of cooled air and vaporizes into superheated vapor and/or high quality vapor mixture. An air handler or evaporator fan (not shown) is positioned adjacent to the evaporator 154 and may facilitate or urge the flow of cooled air across evaporator 154 in order to facilitate heat transfer. From evaporator 154, refrigerant may return to compressor 152 and the vapor-compression cycle may continue.

As explained above, environmental control system 148 includes a sealed system 150 for providing a flow of heated air or a flow cooled air throughout grow chamber 122 as needed. To direct this air, environmental control system 148 includes a duct system 160 for directing the flow of temperature regulated air, identified herein simply as flow of air 162 (see, e.g., FIG. 3). In this regard, for example, an evaporator fan can generate a flow of cooled air as the air passes over evaporator 154 and a condenser fan can generate a flow of heated air as the air passes over condenser 156.

These flows of air 162 are routed through a cooled air supply duct and/or a heated air supply duct (not shown), respectively. In this regard, it should be appreciated that environmental control system 148 may generally include a plurality of ducts, dampers, diverter assemblies, and/or air handlers to facilitate operation in a cooling mode, in a heating mode, in both a heating and cooling mode, or any other mode suitable for regulating the environment within grow chamber 122. It should be appreciated that duct system 160 may vary in complexity and may regulate the flows of air from sealed system 150 in any suitable arrangement through any suitable portion of grow chamber 122.

Gardening appliance 100 may include a control panel 170. Control panel 170 includes one or more input selectors 172, such as e.g., knobs, buttons, push buttons, touchscreen interfaces, etc. In addition, input selectors 172 may be used to specify or set various settings of gardening appliance 100, such as e.g., settings associated with operation of sealed system 150. Input selectors 172 may be in communication with a processing device or controller 174. Control signals generated in or by controller 174 operate gardening appliance 100 in response to input selectors 172. Additionally, control panel 170 may include a display 176, such as an indicator light or a screen. Display 176 is communicatively coupled with controller 174 and may display information in response to signals from controller 174. Further, as will be described herein, controller 174 may be communicatively coupled with other components of gardening appliance 100, such as e.g., one or more sensors, motors, or other components.

As used herein, "processing device" or "controller" may refer to one or more microprocessors or semiconductor devices and is not restricted necessarily to a single element. The processing device can be programmed to operate gardening appliance 100. The processing device may include, or be associated with, one or more memory elements (e.g., non-transitory storage media). In some such embodiments, the memory elements include electrically erasable, programmable read only memory (EEPROM). Generally, the memory elements can store information accessible processing device, including instructions that can be executed by processing device. Optionally, the instructions can be software or any set of instructions and/or data that when executed by the processing device, cause the processing device to perform operations.

The gardening appliance 100 generally includes a rotatable carousel, referred to herein as a grow module 200 that is mounted within liner 120, e.g., such that it is within grow chamber 122. As illustrated, grow module 200 includes a central hub 202 that extends along and is rotatable about a central axis 204. Specifically, according to the illustrated embodiment, central axis 204 is parallel to the vertical direction V. However, it should be appreciated that central axis 204 could alternatively extend in any suitable direction, e.g., such as the horizontal direction. In this regard, grow module 200 generally defines an axial direction, i.e., parallel to central axis 204, a radial direction R that extends perpendicular to central axis 204, and a circumferential direction C that extends around central axis 204 (e.g. in a plane perpendicular to central axis 204).

Grow module 200 may further include a plurality of partitions 206 that extend from central hub 202 substantially along the radial direction R. In this manner, grow module 200 defines a plurality of chambers, referred to herein generally by reference numeral 210, by dividing or partitioning grow chamber 122. Referring specifically to a first embodiment of grow module 200 illustrated in FIGS. 1 through 8, grow module 200 includes three partitions 206 to define a first chamber 212, a second chamber 214, and a third chamber 216, which are circumferentially spaced relative to each other. In general, as grow module 200 is rotated within grow chamber 122, the plurality of chambers 210 define substantially separate and distinct growing environments, e.g., for growing plants 124 having different growth needs.

More specifically, partitions 206 may extend from central hub 202 to a location immediately adjacent to the liner 120. Although partitions 206 are described as extending along the radial direction, it should be appreciated that they need not be entirely radially extending. For example, according to the illustrated embodiment, the distal ends of each partition is joined with an adjacent partition using an arcuate wall 218, which is generally used to support the plants 124.

Notably, it is desirable according to exemplary embodiments to form a substantial seal between partitions 206 and liner 120. Therefore, according to an exemplary embodiment, grow module 200 may define a grow module diameter 220 (e.g., defined by its substantially circular footprint formed in a horizontal plane). Similarly, enclosed back portion 130 of liner 120 may be substantially cylindrical and may define a liner diameter 222. In order to prevent a significant amount of air from escaping between partitions 206 and liner 120, liner diameter 222 may be substantially equal to or slightly larger than grow module diameter 220.

The gardening appliance 100 may further include a motor 230 or another suitable driving element or device for selectively rotating grow module 200 during operation of gardening appliance 100. In this regard, according to the illustrated embodiment, motor 230 is positioned below grow module 200, e.g., within mechanical compartment 140, and is operably coupled to grow module 200 along central axis 204 for rotating grow module 200.

As used herein, "motor" may refer to any suitable drive motor and/or transmission assembly for rotating grow module 200. For example, motor 230 may be a brushless DC electric motor, a stepper motor, or any other suitable type or configuration of motor. For example, motor 230 may be an AC motor, an induction motor, a permanent magnet synchronous motor, or any other suitable type of AC motor. In addition, motor 230 may include any suitable transmission assemblies, clutch mechanisms, or other components.

According to an exemplary embodiment, motor 230 may be operably coupled to controller 174, which is programmed to rotate grow module 200 according to predetermined operating cycles, based on user inputs (e.g. via input selectors 172), etc. In addition, controller 174 may be communicatively coupled to one or more sensors, such as temperature or humidity sensors, positioned within the various chambers 210 for measuring temperatures and/or humidity, respectively. Controller 174 may then operate motor 230 in order to maintain desired environmental conditions for each of the respective chambers 210. For example, as will be described in more detail below, gardening appliance 100 includes features for providing certain locations of gardening appliance 100 with light, temperature control, proper moisture, nutrients, and other requirements for suitable plant growth. Motor 230 may be used to position specific chambers 210 where needed to receive such growth requirements.

According to an exemplary embodiment, such as where three partitions 206 form three chambers 212-216, controller 174 may operate motor 230 to index grow module 200 sequentially through a number of preselected positions. More specifically, motor 230 may rotate grow module 200 in a counterclockwise direction (e.g. when viewed from a top of grow module 200) in 120° increments to move chambers 210 between sealed positions and display positions. As used herein, a chamber 210 is considered to be in a "sealed position" when that chamber 210 is substantially sealed between grow module 200 (i.e., central hub 202 and adjacent to the partitions 206) and liner 120. By contrast, a chamber 210 is considered to be in a "display position" when that chamber 210 is at least partially exposed to front display opening 132, such that a user may access the plants 124 positioned within that chamber 210.

Figure 4:
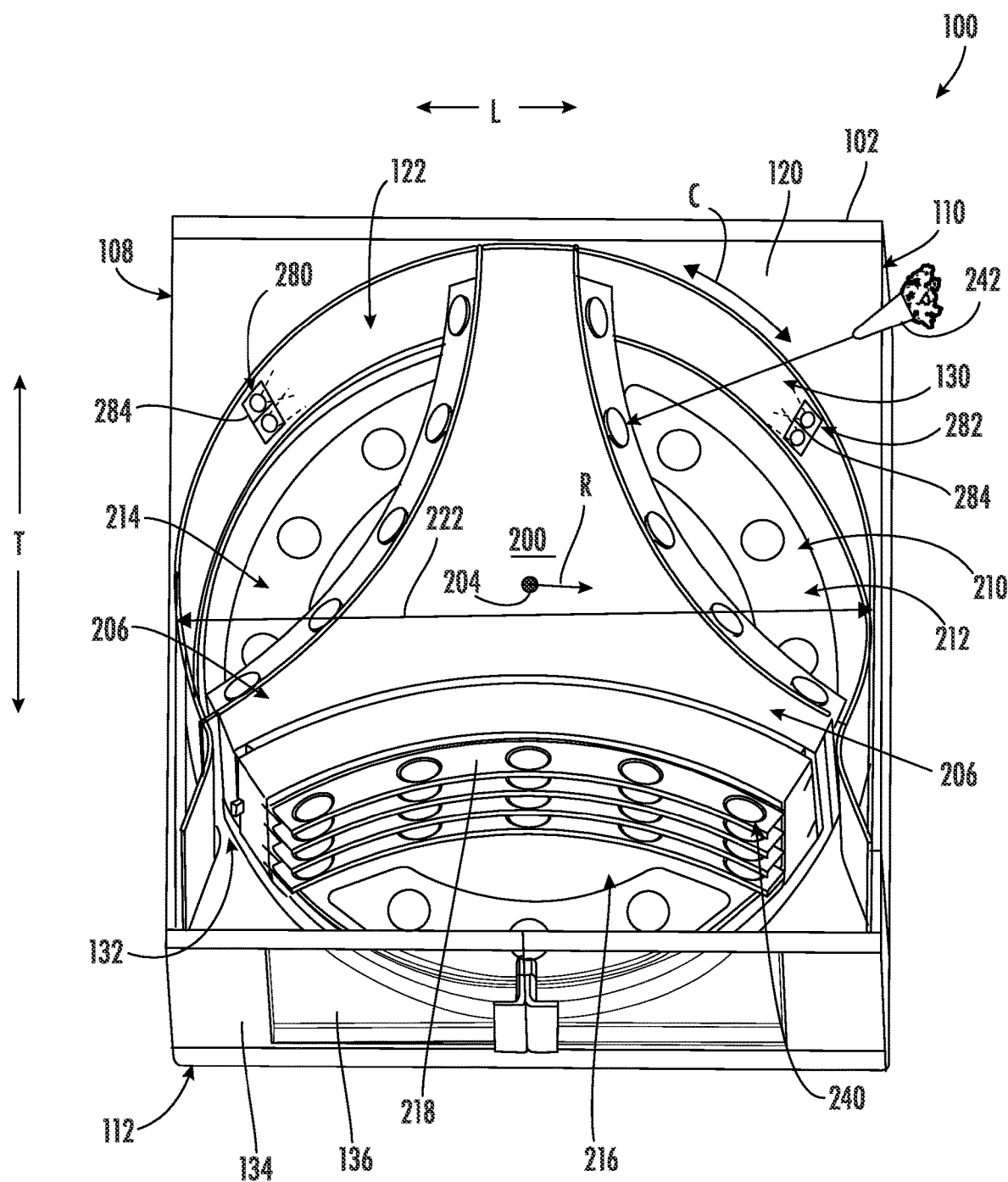
FIG. 4 depicts a top perspective view of the exemplary gardening appliance of FIG. 1, with the top panel of the cabinet removed to reveal a rotatable grow module according to an exemplary embodiment of the present subject matter.
Figure 5:
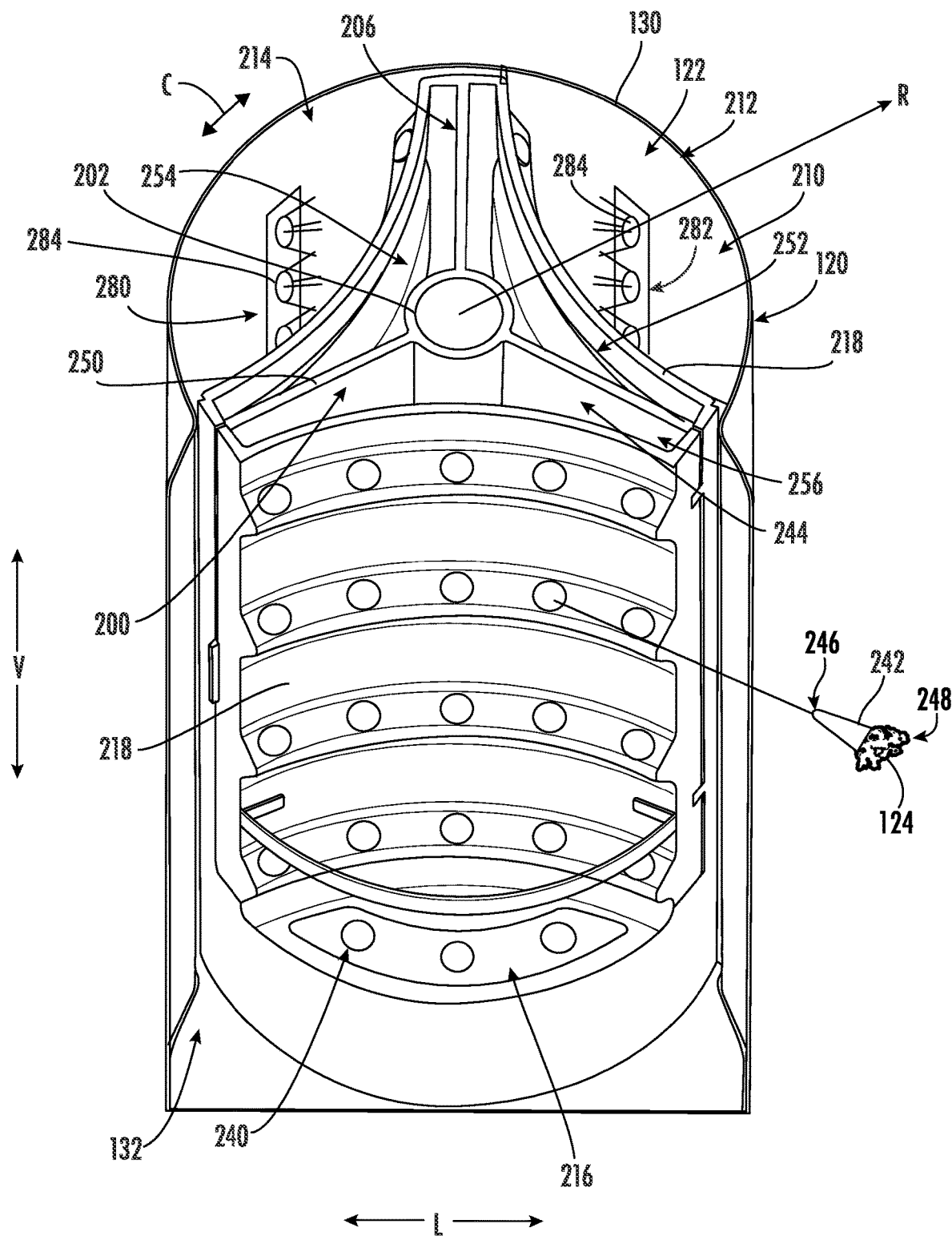
FIG. 5 depicts a perspective cross sectional view of the exemplary gardening appliance of FIG. 1 according to another exemplary embodiment of the present subject matter.
Figure 6:
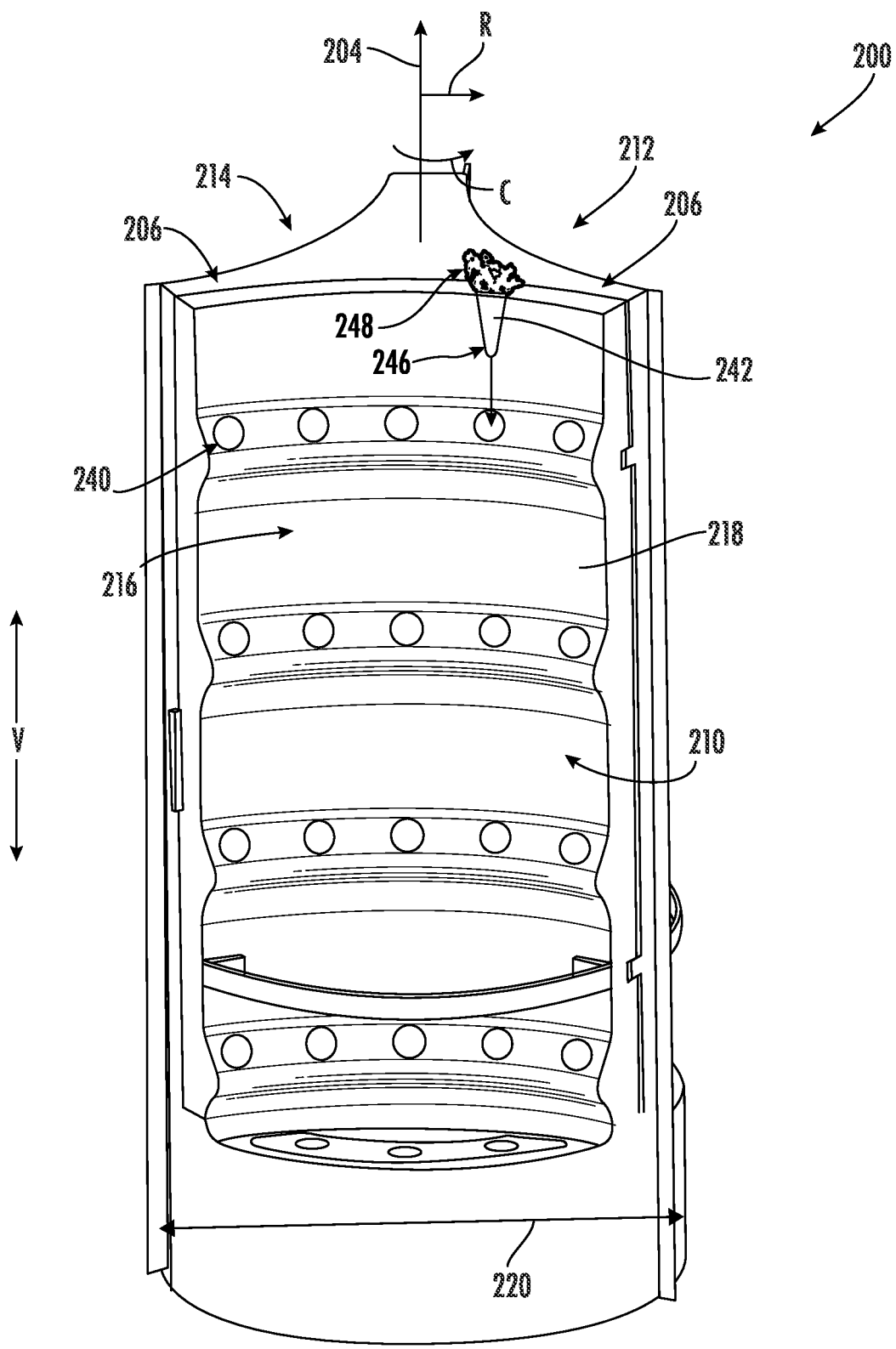
FIG. 6 depicts a perspective view of the grow module of the exemplary gardening appliance of FIG. 1 according to another exemplary embodiment of the present subject matter.

For example, as illustrated in FIGS. 4 and 5, first chamber 212 and second chamber 214 are both in a sealed position, whereas third chamber 216 is in a display position. As motor 230 rotates grow module 200 by 120 degrees in the counterclockwise direction, second chamber 214 will enter the display position, while first chamber 212 and third chamber 216 will be in the sealed positions. Motor 230 may continue to rotate grow module 200 in such increments to cycle grow chambers 210 between these sealed and display positions.

Referring now generally to FIGS. 4 through 8, grow module 200 will be described in more detail according to an exemplary embodiment of the present subject matter. As shown, grow module 200 defines a plurality of apertures 240 which are generally configured for receiving plant pods 242 into an internal root chamber 244. Plant pods 242 generally contain seedlings or other material for growing plants positioned within a mesh or other support structure through which roots of plants 124 may grow within grow module 200. A user may insert a portion of plant pod 242 (e.g., a seed end or root end 246) having the desired seeds through one of the plurality of apertures 240 into the internal root chamber 244. A plant end 248 of the plant pod 242 may remain within the grow chamber 210 such that plants 124 may grow from grow module 200 such that they are accessible by a user. In this regard, grow module 200 defines the internal root chamber 244, e.g., within at least one of central hub 202 and the plurality of partitions 206. As will be explained below, water and other nutrients may be supplied to the root end 246 of plant pods 242 within the internal root chamber 244. Notably, apertures 240 may be covered by a flat flapper seal (not shown) to prevent water from escaping the internal root chamber 244 when no plant pod 242 is installed.

Figure 7:
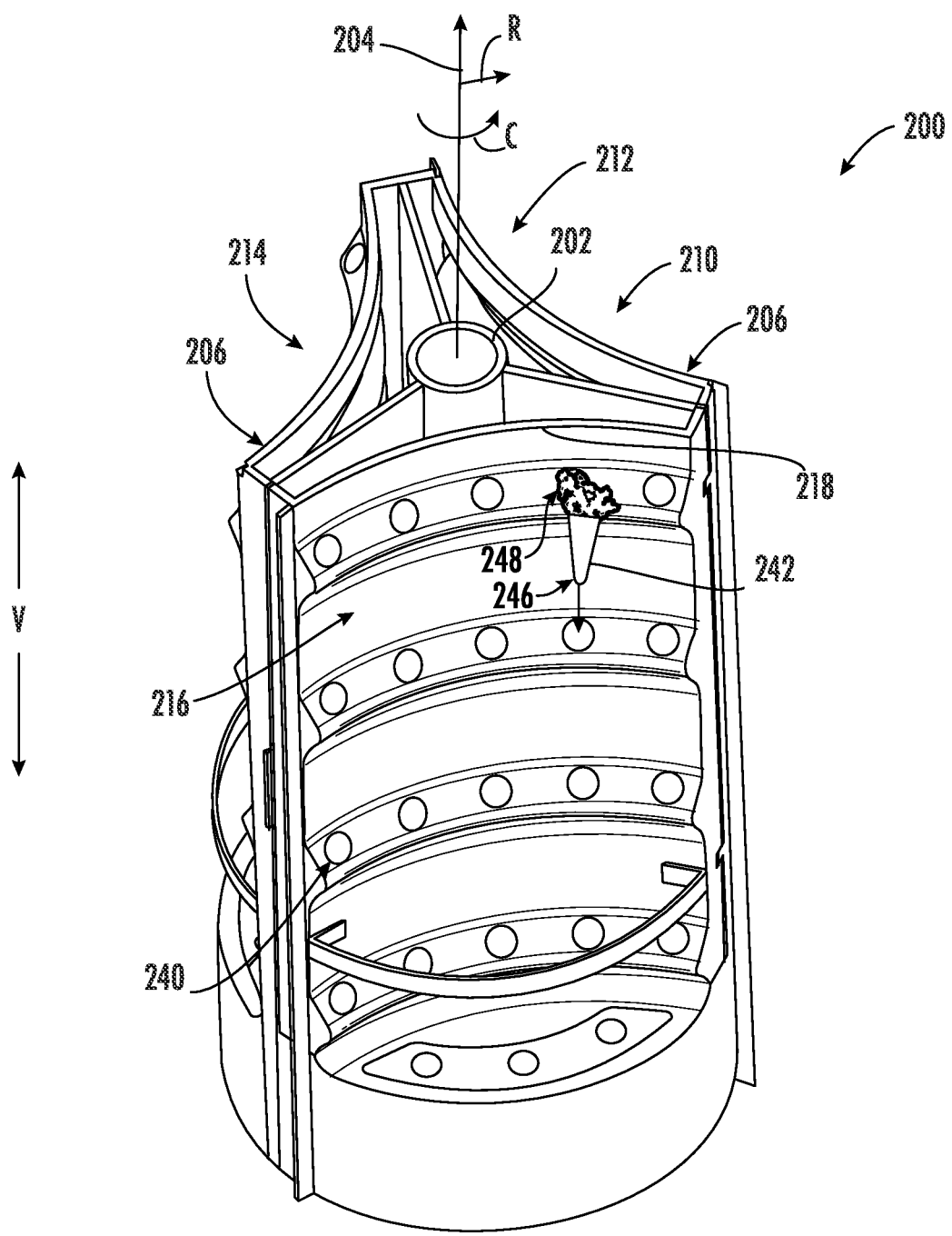
FIG. 7 depicts a perspective cross sectional view of the exemplary grow module of FIG. 6 according to another exemplary embodiment of the present subject matter.
Figure 8:
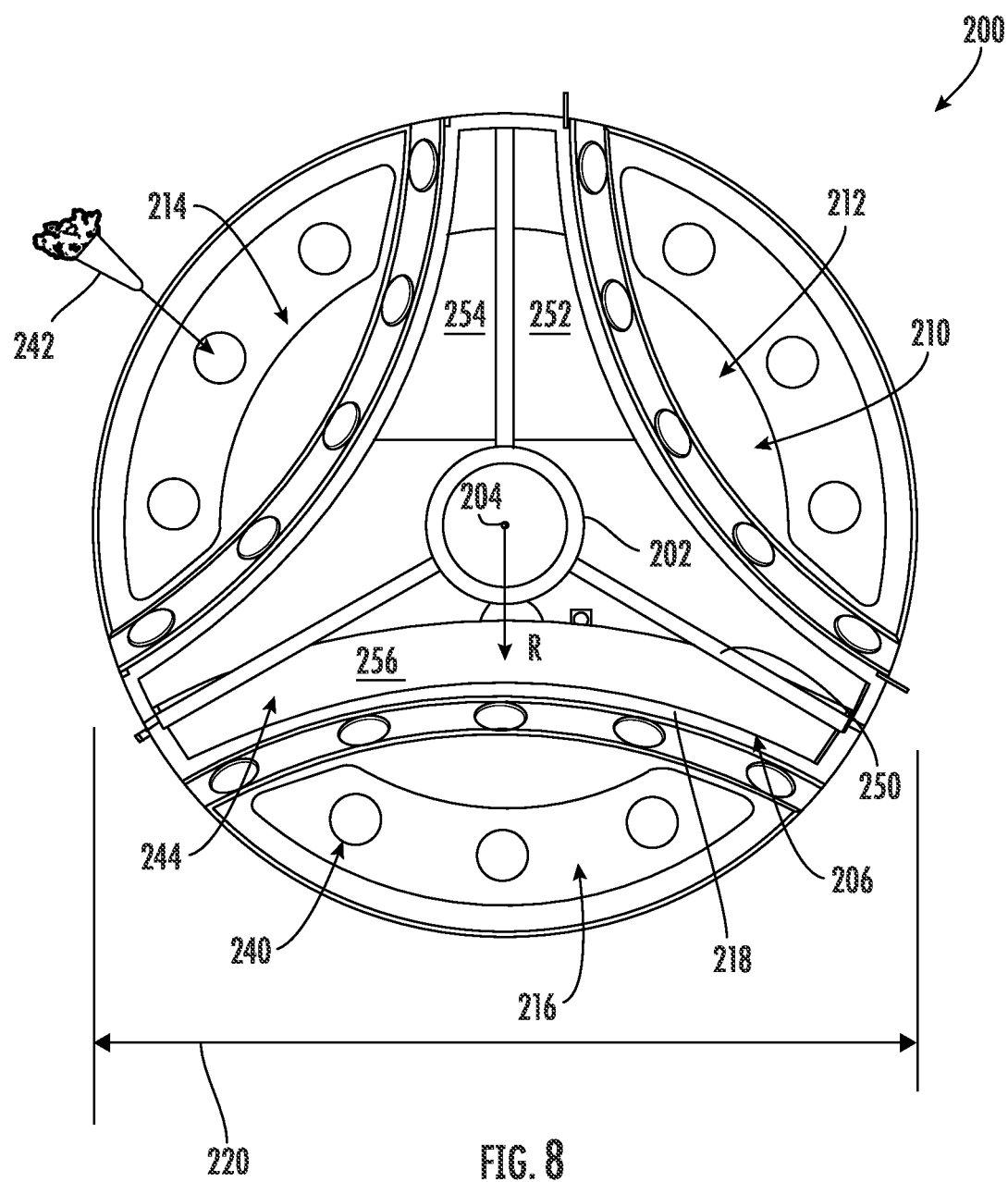
FIG. 8 depicts a top cross-sectional view of the exemplary grow module of FIG. 6 according to another exemplary embodiment of the present subject matter.

As best shown in FIGS. 5 and 7, grow module 200 may further include an internal divider 250 that is positioned within the internal root chamber 244 to divide the internal root chamber 244 into a plurality of root chambers, each of the plurality of root chambers being in fluid communication with one of the plurality of grow chambers 210 through the plurality of apertures 240. More specifically, according to the illustrated embodiment, internal divider 250 may divide the internal root chamber 244 into a first root chamber 252, a second root chamber 254, and a third root chamber 256. According to an exemplary embodiment, first root chamber 252 may provide water and nutrients to plants 124 positioned in the first chamber 212, second root chamber 254 may provide water and nutrients to plants 124 positioned in the second chamber 214, and third root chamber 256 may provide water and nutrients to plants 124 positioned in the third chamber 216. In this manner, environmental control system 148 may control the temperature and/or humidity of each of the plurality of chambers 212-216 and the plurality of root chambers 252-256 independently of each other.

Notably, environmental control system 148 described above is generally configured for regulating the temperature and humidity (e.g., or some other suitable water level quantity or measurement) within one or all of the plurality of chambers 210 and/or root chambers 252-256 independently of each other. In this manner, a versatile and desirable growing environment may be obtained for each and every chamber 210.

In some implementations, the gardening appliance 100 can include a first lighting assembly 280 and a second lighting assembly 282, which are generally configured for providing light into selected grow chambers 210 to facilitate photosynthesis and growth of plants 124. As shown, first light assembly 280 and second light assembly 282 may each include a plurality of light sources 284 stacked in an array, e.g., extending along the vertical direction V. For example, light sources 284 may be mounted directly to liner 120 within grow chamber 122 or may alternatively be positioned behind liner 120 such that light is projected through a transparent window or light pipe into grow chamber 122. The position, configuration, and type of light sources 284 described herein are not intended to limit the scope of the present subject matter in any manner.

Light sources 284 may be provided as any suitable number, type, position, and configuration of electrical light source(s), using any suitable light technology and illuminating in any suitable color. For example, according to the illustrated embodiment, light source 284 includes one or more light emitting diodes (LEDs), which may each illuminate in a single color (e.g., white LEDs), or which may each illuminate in multiple colors (e.g., multi-color or RGB LEDs) depending on the control signal from controller 174. However, it should be appreciated that according to alternative embodiments, light sources 284 may include any other suitable traditional light bulbs or sources, such as halogen bulbs, fluorescent bulbs, incandescent bulbs, glow bars, a fiber light source, etc.

As explained above, light generated from the first light assembly 280 and the second light assembly 282 may result in light pollution within a room where gardening appliance 100 is located. Therefore, aspects of the present subject matter are directed to features for reducing light pollution, or to the blocking of light from light sources 284 through front display opening 132. Specifically, as illustrated, first light assembly 280 and second light assembly 282 are positioned only within the enclosed back portion 130 of liner 120 such that only grow chambers 210 which are in a sealed position are exposed to light from light sources 284. Specifically, grow module 200 acts as a physical partition between light assemblies 280, 282 and front display opening 132. In this manner, as illustrated in FIG. 5, no light may pass from first chamber 212 or second chamber 214 through grow module 200 and out front display opening 132. As grow module 200 rotates, two of the three grow chambers 210 will receive light from the first light assembly 280 and the second light assembly 282 at a time.

Gardening appliance 100 and grow module 200 have been described above to explain an exemplary embodiment of the present subject matter. However, it should be appreciated that variations and modifications may be made while remaining within the scope of the present subject matter. For example, according to alternative embodiments, gardening appliance 100 may be a simplified to a two-chamber embodiment with a square liner 120 and a grow module 200 having two partitions 206 extending from opposite sides of central hub 202 to define a first grow chamber and a second grow chamber. According to such an embodiment, by rotating grow module 200 by 180 degrees about central axis 204, the first chamber may alternate between the sealed position (e.g., facing the rear side 114 of cabinet 102) and the display position (e.g., facing the front side 112 of cabinet 102). By contrast, the same rotation will move the second chamber from the display position to the sealed position.

Figure 9:
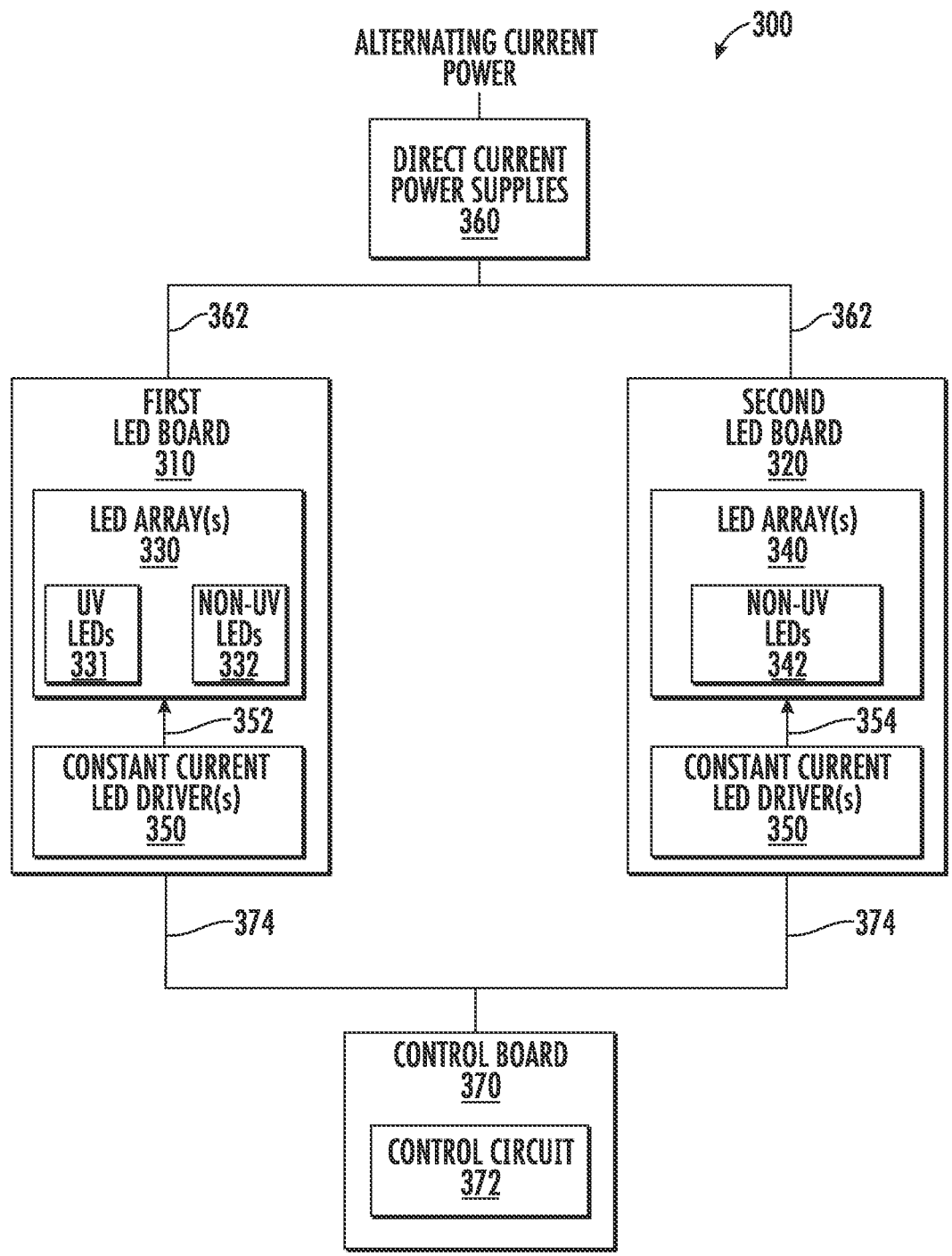
FIG. 9 depicts a schematic of a modular lighting system according to example embodiments of the present disclosure.

Referring now to FIG. 9, a schematic of a modular lighting system 300 for the garden appliance 100 discussed above with reference to FIGS. 1 through 8 is provided according to example embodiments of the present disclosure. As shown, the modular lighting system 300 can include a first LED board 310 and a second LED board 320. It should be understood that the first LED board 310 can replace the first light assembly 280 discussed above with reference to FIGS. 4 and 5. It should also be understood that the second LED board can replace the second light assembly 282 discussed above with reference to FIGS. 4 and 5. Details of the first LED board 310 and the second LED board 320 will now be discussed.

The first LED board 310 can include one or more LED arrays 330. The one or more LED arrays 330 can include one or more ultraviolet LED light sources 331 configured to illuminate the second chamber 214 (FIG. 5) of the grow module 200 (FIG. 5) with ultraviolet light. The one or more LED arrays 330 can further include one or more non-ultraviolet LED light sources 332 configured to illuminate the second chamber 214 (FIG. 5) of the grow module 200 (FIG. 5) with non-ultraviolet light. As shown, the second LED board 320 can include one or more LED arrays 340. The one or more LED arrays 340 can include one or more non-ultraviolet LED light sources 342 configured to illuminate the third chamber 216 (FIG. 5) of the grow module 200 (FIG. 5) with non-ultraviolet light.

The first LED board 310 and the second LED board 320 can each include one or more constant current LED drivers 350. The one or more constant current LED drivers 350 can be configured to receive input power 362 (e.g., direct current power signal). For instance, the modular lighting system 300 can include one or more direct current power supplies 360 configured to receive an alternating current power from an alternating current power source (not shown). The one or more direct current power supplies 360 can be configured to convert the alternating current power to direct current power that is provided to the one or more constant current LED drivers 350 as the input power 362.

The one or more constant current LED drivers 350 can be configured to convert the input power 362 to a suitable driver current 352, 354 for powering the one or more LED arrays 330, 340 of the first LED board 310 and the second LED board 320, respectively. The one or more constant current LED drivers 350 can include various components, such as switching elements (e.g. transistors) that are controlled to provide the suitable driver current 352, 354.

In some implementations, the modular lighting system 300 can include a control board 370 having a control circuit 372 configured to output one or more control signals 374 to the one or more constant current LED drivers 350. Furthermore, the one or more constant current LED drivers 350 can be configured to convert the input power 362 to the driver current 352, 354 based, at least in part, on the one or more control signals 374. For instance, in some implementations, the one or more control signals 374 can include a pulse width modulated signal.

It should be understood that having the one or more constant current LED drivers 350 on the first LED board 310 and the second LED board 320 can allow the first LED board 310 and the second LED board 320 to be swapped out for other LED board having different LED arrays without needing to adjust the output (e.g., one or more control signals 374) of the control circuit 372 on the control board 370. In this manner, the end-user can swap out the LED boards to configured to modular lighting system 300 to accommodate different types of plants, funguses, etc. For instance, since mushrooms grow most efficiently in blue light, the end-user can install LED boards with LED arrays having one or more LED light sources configured to emit blue light if the end-user wishes to grow mushrooms. Furthermore, if the end-user later decides to grow a plant that does not grow efficiently in blue light, the end-user can swap out the LED boards with different LED boards having LED arrays with one or more LED light sources configured to emit light of a wavelength that does promote growth of the plant.

Figure 10:
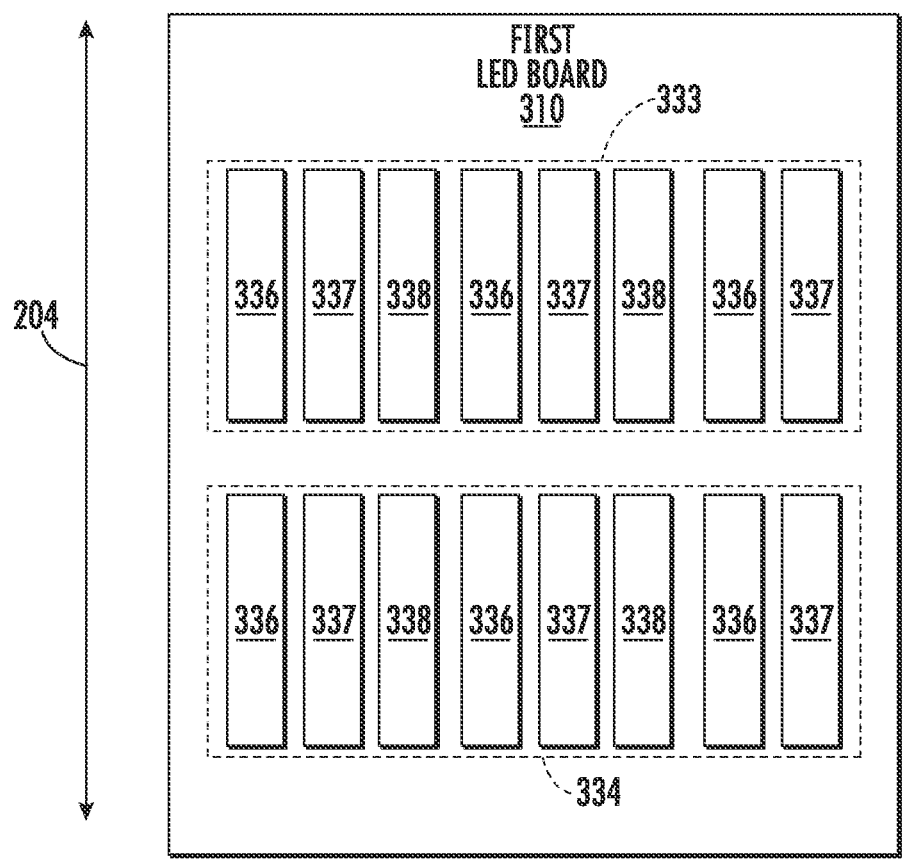
FIG. 10 depicts an arrangement of LED array son a first LED board of a modular lighting system according to example embodiments of the present disclosure.
Figure 11:
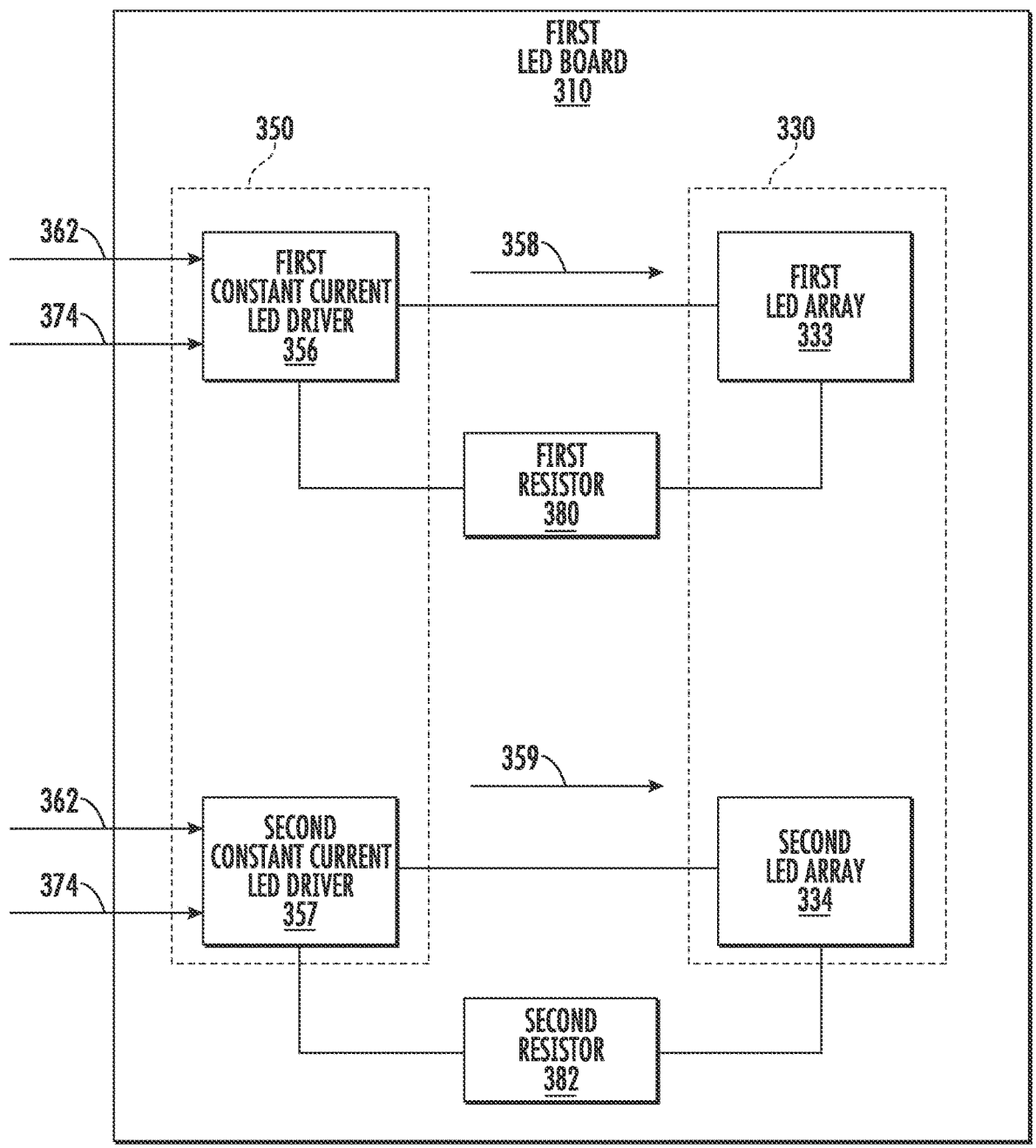
FIG. 11 depicts components of a first LED board of a modular lighting system according to example embodiments of the present disclosure.

Referring now to FIGS. 10 and 11, the one or more LED arrays 330 (FIG. 9) of the first LED board 310 can include, for instance, a first LED array 333 and a second LED array 334. As shown, the first LED array 333 and the second LED array 334 can be spaced apart from one another on the first LED board 310. For instance, in some implementations, the first LED board 310 can be positioned such that the first LED array 333 and the second LED array 334 are spaced apart from one another along the central axis 204 of the grow module 200 (FIG. 4).

In some implementations, the first LED array 333 and the second LED array 334 can each include an ultraviolet light source 338 configured to illuminate the second chamber 214 (FIG. 4) of the grow module 200 with ultraviolet light. It should be understood that ultraviolet light ranges from 10 nanometers to 400 nanometers. Furthermore, the first LED array 333 and the second LED array 334 can include a first non-ultraviolet LED light source 336 and a second non-ultraviolet LED light source 337. In some implementations, the first non-ultraviolet LED light source 336 and the second non-ultraviolet LED light source 337 can be configured to illuminate the second chamber 214 of the grow module 200 with non-ultraviolet light having a wavelength that is greater than 400 nanometers. For instance, in some implementations, the wavelength can range from 405 nanometers to 790 nanometers.

In some implementations, the one or more constant current LED drivers 350 of the first LED board 310 can include a first constant current LED driver 356 and a second constant current LED driver 357. The first constant current LED driver 356 can be configured to provide a first driver current 358 to the first LED array 333. The second constant current LED driver 357 can be configured to provide a second driver current 359 to the second LED array 334. In this manner, the first LED array 333 and the second LED array 334 can be independently controlled via the first constant current LED driver 356 and the second constant current LED driver 357, respectively.

In some implementations, the first constant current LED driver 356 and the second constant current LED driver 357 can have different power rating. For instance, the first constant current LED driver 356 can have a first power rating, whereas the second constant current LED driver 357 can have a second power rating that is different (e.g., higher or lower) than the first power rating.

In some implementations, the first LED board 310 can include a first resistor 380 and a second resistor 382. The first resistor 380 can be coupled between the first constant current LED driver 356 and the first LED array 333. In this manner, the first constant current LED driver 356 can set the first driver current 358 based, at least in part, on a resistance of the first resistor 380. The second resistor 382 can be coupled between the second constant current LED driver 357 and the second LED array 334. In this manner, the second constant current LED driver 357 can set the second driver current 359 based, at least in part, on the second resistor 382.

Figure 12:
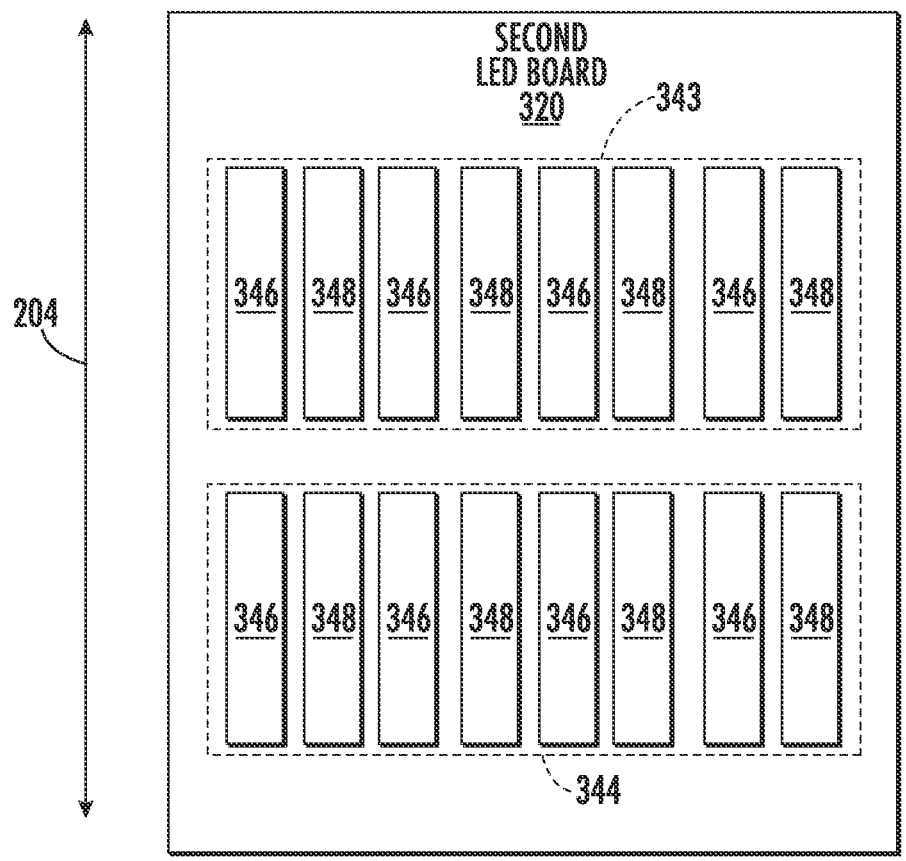
FIG. 12 depicts an arrangement of LED arrays on a second LED board of a modular lighting system according to example embodiments of the present disclosure.
Figure 13:
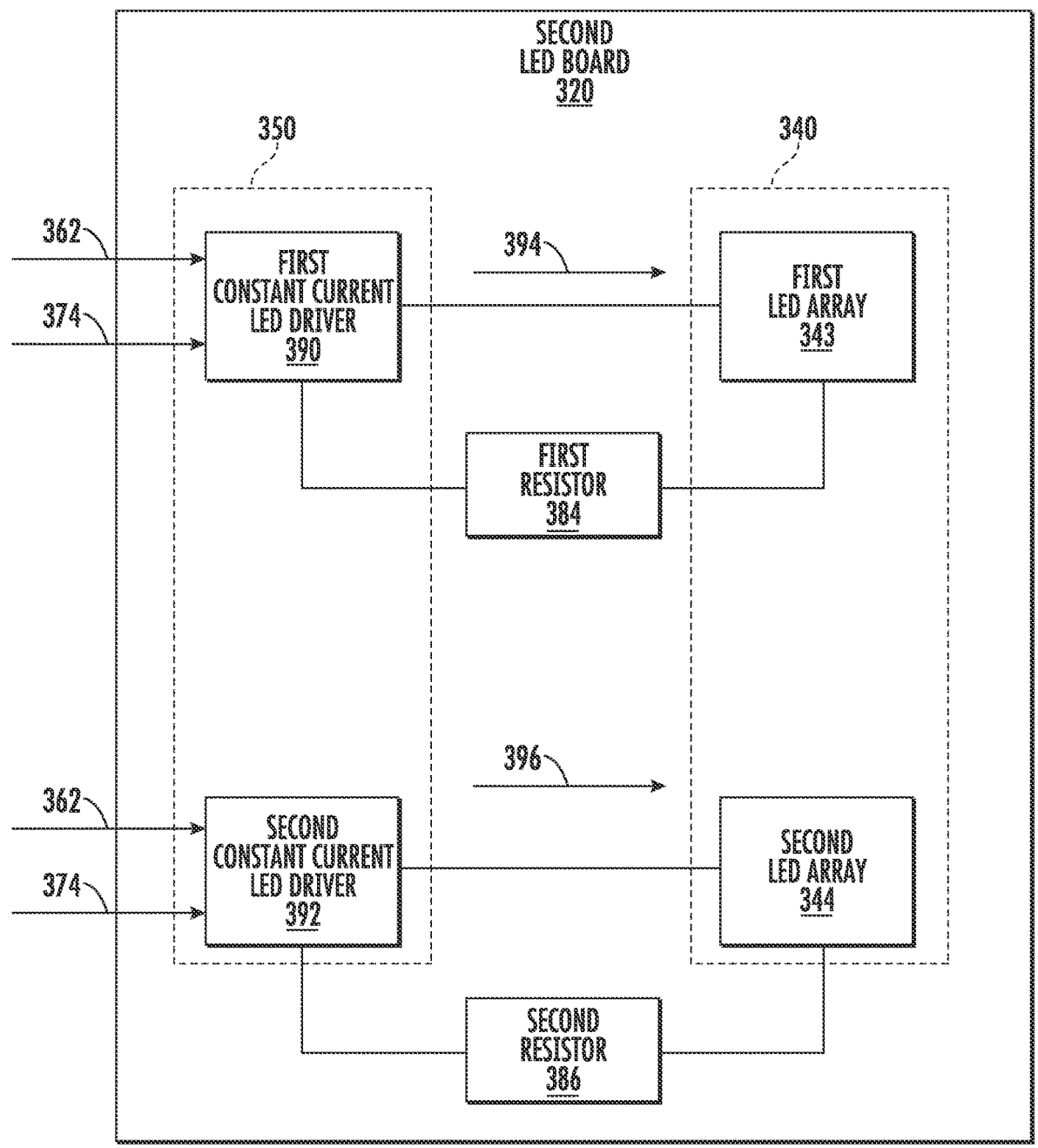
FIG. 13 depicts components of a second LED board of a modular lighting system according to example embodiments of the present disclosure.

Referring now to FIGS. 12 and 13, the one or more LED arrays (FIG. 9) of the second LED board 320 can include, for instance, a first LED array 343 and a second LED array 344. As shown, the first LED array 343 and the second LED array 344 can be spaced apart from one another on the second LED board 320. For instance, in some implementations, the first LED board 310 can be positioned such that the first LED array 343 and the second LED array 344 are spaced apart from one another along the central axis 204 of the grow module 200 (FIG. 4).

As shown, the first LED array 343 and the second LED array 344 can each include a first non-ultraviolet LED light source 346 and a second non-ultraviolet LED light source 348. In some implementations, the first non-ultraviolet LED light source 346 and the second non-ultraviolet LED light source 348 can be configured to illuminate the third chamber 216 (FIG. 4) of the grow module 200 (FIG. 4) with non-ultraviolet light having a wavelength that is greater than 400 nanometers. For instance, in some implementations, the wavelength can range from 405 nanometers to 790 nanometers.

In some implementations, the one or more constant current LED drivers 350 of the second LED board 320 can include a first constant current LED driver 390 and a second constant current LED driver 392. The first constant current LED driver 390 can be configured to provide a first driver current 394 to the first LED array 343. The second constant current LED driver 392 can be configured to provide a second driver current 396 to the second LED array 344. In this manner, the first LED array 343 and the second LED array 344 can be independently controlled via the first constant current LED driver 390 and the second constant current LED driver 392, respectively.

In some implementations, the first constant current LED driver 390 and the second constant current LED driver 392 can have different power rating. For instance, the first constant current LED driver 390 can have a first power rating, whereas the second constant current LED driver 392 can have a second power rating that is different (e.g., higher or lower) than the first power rating.

In some implementations, the first LED board 310 can include a first resistor 384 and a second resistor 386. The first resistor 384 can be coupled between the first constant current LED driver 390 and the first LED array 343. In this manner, the first constant current LED driver 390 can set the first driver current 394 based, at least in part, on a resistance of the first resistor 384. The second resistor 386 can be coupled between the second constant current LED driver 392 and the second LED array 344. In this manner, the second constant current LED driver 392 can set the second driver current 396 based, at least in part, on the second resistor 386.

Figure 14:
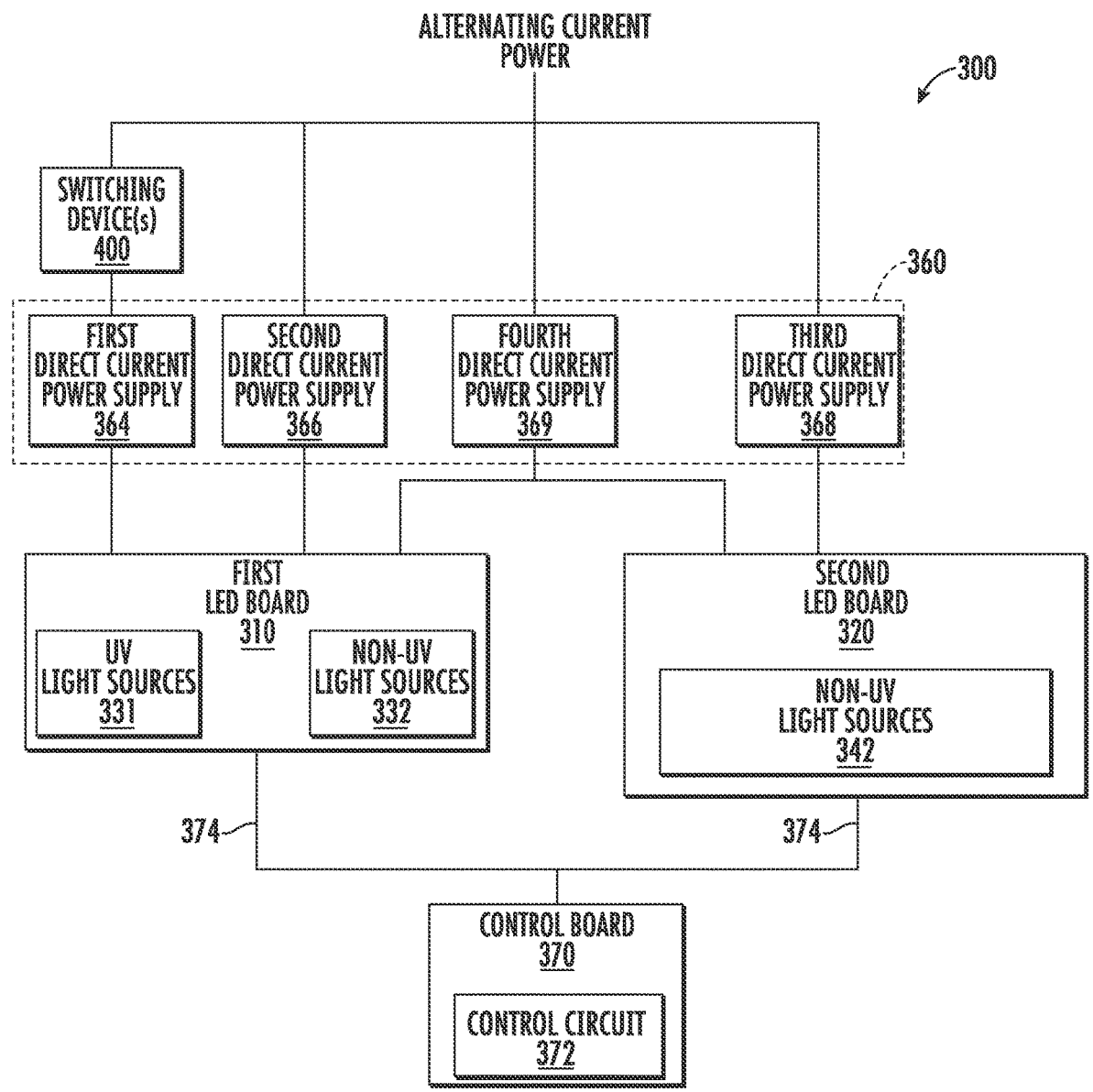
FIG. 14 depicts a modular lighting system having multiple direct current power supplies according to example embodiments of the present disclosure.

Referring now to FIG. 14, the modular lighting system 300 can, in some implementations, include multiple direct current power supplies 360. For instance, the modular lighting system 300 can include a first direct current power supply 364 coupled to the alternating current power source. The first direct current power supply 364 can be configured to provide direct current power for powering the one or more ultraviolet LED light sources 331 of the first LED board 310.

In some implementations, the modular lighting system 300 can include one or more switching devices 400 coupled between the first direct current power supply 364 and the alternating current source. The one or more switching devices 400 can be configured to selectively couple the first direct current power supply 364 to the alternating current power source based, at least in part, on a position of the doors 134 (FIGS. 1 and 2) of the garden appliance 100. For instance, the one or more switching devices 400 can be configured to couple the first direct current power supply 364 to the alternating current power source when the doors 134 of the garden appliance 100 are in the closed position (FIG. 1). Conversely, the one or more switching devices 400 can be configured to decouple the first direct current power supply 364 from the alternating current power source when the doors 134 of the garden appliance 100 are in the open position (FIG. 2). In this manner, the one or more ultraviolet LED light sources 331 can be deactivated (e.g., turned off) such that the end-user is not exposed to ultraviolet light when the doors 134 of the garden appliance 100 are in the open position.

In some implementations, the modular lighting system 300 can include a second direct current power supply 366 coupled to the alternating current power source. The second direct current power supply 366 can be configured to provide direct current power for powering the one or more non-ultraviolet LED light sources 332 of the first LED board 310. The modular lighting system 300 can further include a third direct current power supply 368 coupled to the alternating current power source. The third direct current power supply 368 can be configured to provide direct current power for powering the one or more non-ultraviolet LED light sources 342 of the second LED board 320.

In some implementations, the modular lighting system 300 can include a fourth direct current power supply 369 coupled to the alternating current power source. The fourth direct current power supply 369 can be configured to provide direct current for powering the one or more non-ultraviolet LED light sources 332, 342 of the first LED board 310 and the second LED board 320, respectively. For instance, in some implementations, the fourth direct current power supply 369 can be configured to split direct current power into a first portion and a second portion. The first portion of the direct current power can be provided to the one or more non-ultraviolet LED light sources 332 of the first LED board 310, whereas the second portion of the direct current power can be provided to the one or more non-ultraviolet LED light sources 342 of the second LED board 320. In some implementations, the first portion of the direct current power can be different (e.g., less or greater) than the second portion of the direct current power.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gardening appliance, comprising:
   a cabinet;
   a liner positioned within the cabinet, the liner defining a chamber;
   a grow module mounted within the liner, the grow module defining a pod aperture configured to receive a plant pod, the grow module comprising a central hub rotatable about a central axis, the grow module further comprising a plurality of partitions, each of the plurality of partitions extending from the central hub to divide the chamber into a plurality of chambers;
   one or more doors coupled to the cabinet, the one or more doors movable between an open position and a closed position to permit selective access to the grow module; and
   a modular lighting system comprising:
      a first LED board comprising one or more LED arrays, the one or more LED arrays comprise one or more ultraviolet LED light sources and one or more non-ultraviolet LED light sources configured to illuminate a first chamber of the plurality of chambers, the first LED board further comprising one or more constant current LED drivers configured to output a driver current for the one or more LED arrays; and
      a second LED board comprising one or more LED arrays, the one or more LED arrays having one or more non-ultraviolet LED light sources configured to illuminate a second chamber of the plurality of chambers, the second LED board further comprising one or more constant current LED drivers configured to output a driver current for the one or more LED arrays of the second LED board.

2. The gardening appliance of claim 1, further comprising:
   a control board comprising a control circuit configured to provide one or more control signals to the one or more constant current LED drivers of the first LED board and the one or more constant current LED drivers of the second LED board.

3. The gardening appliance of claim 2, wherein:
   the one or more constant current LED drivers of the first LED board are configured to regulate the driver current for the one or more LED arrays of the first LED board based, at least in part, on the one or more control signals;
   the one or more constant current LED drivers of the second LED board are configured to regulate the driver current for the one or more LED arrays of the second LED board based, at least in part, on the one or more control signals.

4. The gardening appliance of claim 2, wherein the one or more control signals comprise a pulse width modulated (PWM) signals.

5. The gardening appliance of claim 1, wherein the one or more LED arrays of the first LED board comprise:
   a first LED array and a second LED array, the first LED array and the second LED array spaced apart from one another on the first LED board.

6. The gardening appliance of claim 5, wherein the one or more constant current LED drivers of the first LED board comprise:
   a first constant current LED driver configured to output a first driver current for the first LED array; and
   a second constant current LED driver configured to output a second driver current for the second LED array.

7. The gardening appliance of claim 6, wherein the first LED board further comprises:
   a first resistor coupled between the first constant current LED driver and the first LED array; and
   a second resistor coupled between the second constant current LED driver and the second LED array.

8. The gardening appliance of claim 6, wherein:
   the first constant current LED driver has a first power rating; and
   the second constant current LED driver has a second power rating, the second power rating being different than the first power rating.

9. The gardening appliance of claim 6, wherein the one or more LED arrays of the second LED board comprise:
   a third LED array and a fourth LED array, the third LED array and the fourth LED array spaced apart from one another on the second LED board.

10. The gardening appliance of claim 9, wherein the one or more constant current LED drivers of the second LED board comprise:
    a third constant current LED driver configured to output a third driver current for the third LED array; and
    a fourth constant current LED driver configured to output a fourth driver current for the fourth LED array.

11. The gardening appliance of claim 10, wherein the second LED board further comprises:
    a first resistor coupled between the third constant current LED driver and the third LED array; and
    a second resistor coupled between the fourth constant current LED driver and the fourth LED array.

12. The gardening appliance of claim 1, wherein the modular lighting system comprises:
    a first direct current power supply coupled to an alternating current power source, the first direct current power supply configured to provide direct current power for powering the one or more ultraviolet light sources of the first LED board;
    a second direct current power supply coupled to the alternating current power source, the second direct current power supply configured to provide direct current power for powering the one or more non-ultraviolet LED light sources of the first LED board; and
    a third direct current power supply coupled to the alternating current power source, the third direct current power supply configured to provide direct current power for powering the one or more non-ultraviolet LED light sources of the second LED board.

13. The gardening appliance of claim 12, wherein the modular lighting system further comprises:
    one or more switching devices coupled between the first direct current power supply and the alternating current power source, the one or more switching devices configured to selectively couple the first direct current power supply to the alternating current power source based, at least in part, on a position of one or more doors of the gardening appliance.

14. The gardening appliance of claim 13, wherein:
wherein when the one or more doors are in the open position, the first direct current power supply is decoupled from the alternating current power source; and
wherein when the one or more doors are in the closed position, the first direct current power supply is coupled to the alternating current power source.

* * * * *